Dec. 27, 1960     M. S. MALTENFORT     2,966,470
PROCESS OF FOAMING AN ADMIXTURE OF A PLASTISOL
AND AN AQUEOUS SURFACTANT SOLUTION
Filed May 26, 1955
Fig.1.
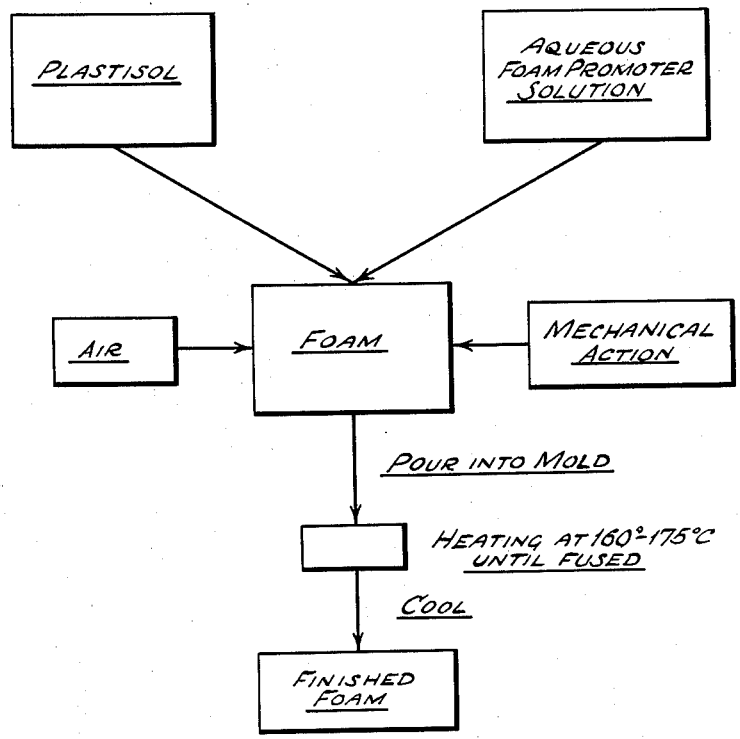
Fig.2.           Fig.3.
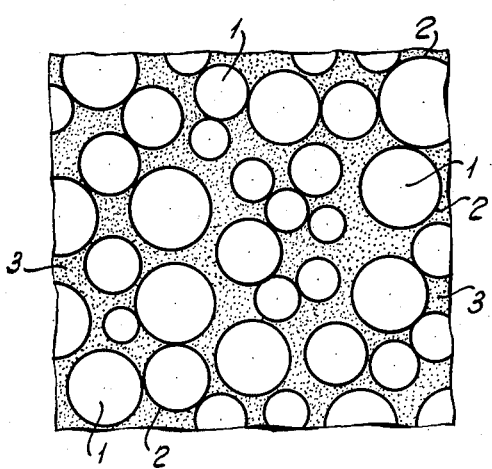 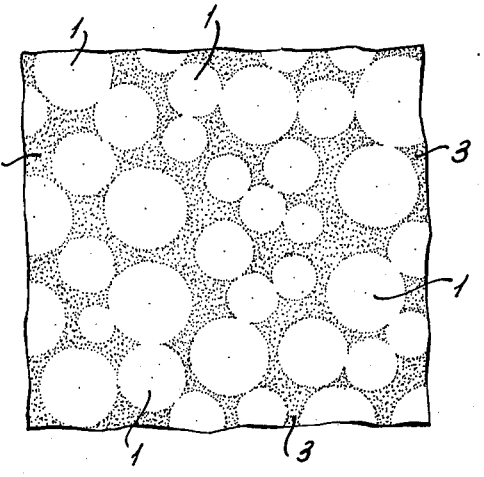

2,966,470
Patented Dec. 27, 1960

2,966,470

PROCESS OF FOAMING AN ADMIXTURE OF A PLASTISOL AND AN AQUEOUS SURFACTANT SOLUTION

Martin S. Maltenfort, Philadelphia, Pa., assignor to Chemedical Research Associates, Upper Darby, Pa.

Filed May 26, 1955, Ser. No. 511,279

9 Claims. (Cl. 260—2.5)

The invention relates to the manufacture of cellular thermoplastics and to the open cell type products thus obtained. More particularly, it relates to the manufacture of such products from vinyl chloride polymers and copolymers.

The methods developed heretofore for the production of vinyl sponges employed either chemical blowing agents, which were incorporated in the resin and decomposed with liberation of gas, or dissolved gas under very high pressures in a dispersion of a resin-plasticizer composition. So far, it has been impossible to use for the production of vinyl sponges a process similar to certain methods employed for the production of rubber sponges, where a rubber latex is simply beaten or whipped to a foam or froth and where said foam or froth is then gelled and vulcanized to a stable structure.

It is a principal object of the invention to provide a simple and economic method for producing open cell vinyl plastic foam or sponge by a beating procedure.

Other objects and advantages will be apparent from a consideration of the specification and claims.

The invention consists essentially in producing an aqueous foam as the discontinuous phase within a continuous plastisol phase, whereby said aqueous foam phase and said plastisol phase are incompatible with each other, and then gelling and fusing the plastisol by heating, whereby simultaneously the water is evaporated and an open cell structure is obtained; the thus obtained open cell structure is then solidified by cooling.

The failure of all prior attempts to produce, without pressure, a stable vinyl plastic foam by simple beating, was due to the impossibility to retain the air bubbles in the plastisol until it was fused and solidified. This difficulty is overcome according to my invention by interposing between the air bubbles and the surrounding plastisol an aqueous phase, which is incompatible with the resin. In this way, I obtain the stability to hold the air bubbles distributed throughout the plastisol in the desired foam structure during the processing steps. In order to obtain this effect, the aqueous phase must contain a surface active agent, preferably a non-ionic surface active agent in combination with an anionic surface active agent. Cationic surface agents are generally not suitable because such nitrogen-containing compounds seem to have a deleterious effect on vinyls during the curing cycle. In addition to the surface active agents, the aqueous phase preferably contains also foam stabilizing and gelling or thickening agents.

The invention will be described more in detail with reference to the accompanying drawings, wherein Fig. 1 is a flow diagram illustrating the principles of the method of the invention, Fig. 2 is a diagrammatic enlarged cross section of an unfused plastisol foam, and Fig. 3 is a similar view of a finished fused foam.

In the invention, the addition of any chemical blowing agent is dispensed with. The two components, the vinyl plastisol and the foam forming or promoting aqueous solution, are prepared separately and then mixed together and coverted into a foam by aeration, whipping or beating. Said foam is then cured in a suitable mold.

Any plasticized vinyl chloride polymer or copolymer composition, which is fluid during the mixing operation, or at least in the curing process, may be used. The resin particles, for which any ball milled powder may be used, should be free from residual surface active agents which may interfere with the action of the foam promoter. The resin is blended with the conventional plasticizers to form a plastisol, which may contain the usual heat stabilizers, fillers and pigments. The plasticizers should consist of, or contain, a plasticizing agent which produces at least partial fusion or gelling of the resin at temperatures below or about 100° C.; otherwise, the plastisol foam may break down when the water is evaporated. Suitable plasticizers of this type are, for instance, modified polypropylene glycol dibenzoates, dipropylene glycol benzoates, tricresyl phosphate. In addition, the plastisol may contain gelling agents which increase the thixotropy. Such gelling agents are, for instance, metallic soaps, like tin or cadmium stearates, or substances having high oil absorption, such as silica gel or bentonite. Aluminum and sodium stearate are less suitable because they interfere with the foam promoter, and zinc stearate reduced the heat stability of the resin.

The plastisol, which preferably contains a vinyl chloride polymer or copolymer and plasticizer, may contain, in addition, other resins in solid or liquified form, which will fuse at about the same temperature as the vinyl resin. Such resins may be added to modify the mechanical properties of the cellular end product and are, for instance, alkyd resins, certain hydrocarbon resins, ketone-formaldehyde condensation products, and the like.

The foam promoting composition comprises an aqueous solution which contains a non-cationic surface active agent, for instance about 5 to 25 percent by weight of a non-ionic surface active agent or 0.5 to 10 percent of an anionic surface active agent. Non-ionic surface active agents, when used alone, make it somewhat difficult to obtain the desired foam volume, and anionic surface active agents develop usually too large bubbles in excessive quantities. Therefore, I prefer to use a mixture of about 5 to 20 percent of a non-ionic surface active agent with about 0.5 to 3 percent of an anionic surface active agent, which produces a foam of excellent uniformity and any desired size of the cells. In addition, the solution may contain about 0.1 to 1.0% of a water soluble foam stabilizer. Suitable anionic surface active agents are, for instance, the dihexyl ester of sodium sulfosuccinic acid, sodium lauryl sulfate and alkyl aryl sulfonates. Examples of suitable non-ionic surface active agents are poly-ethylene glycol ter. dodecyl thioether, sorbitan sesquioleate, propylene glycol monostearate, alkyl polyoxyethylene thioethers, and the like. The addition of foam stabilizers or gelling agents is of advantage as they increase the viscosity of the aqueous phase and the strength of the bubbles, thereby maintaining the foam structure until the vinyl plastisol begins to fuse. Suitable foam stabilizers are vegetable gums, such as Irish moss; animal colloids, such as glue or gelatin; also synthetic hydrophilic colloids (i.e. gelling or thickening agents), such as methyl cellulose and the product sold in commerce under the name of Carbopol 934 (a synthetic gum or thickening agent; see Chemical Trade Names and Commercial Synonyms, by William Haynes, 2nd edition, page 110).

The plastisol and foam forming aqueous solutions are mixed in a ratio of about 7 to 30 percent of aqueous solution to 70–93 percent of plastisol, preferably in a ratio of about 15:85 and then whipped to a froth or foam by means of high speed stirrers, squirrel cage beaters, or any other suitable device well known in the manufacture of foam rubber from latex. The amount and size of the air bubbles may be controlled by the amount of foam forming solution and by the kind of whipping device used, as well as by the length of the beating operation.

In order to give an approximation of the required curing times, I use at a temperature of 160° C. 5 min. for a foam of 1/16" depth and about 1 hour for a 1" foam.

To obtain a high density foam of about 25 lbs./cu. ft., I used an electrically operated wire whip at intermediate speed for about 1–1.5 min.; for a low density foam of about 12 lbs./cu. ft., the required time was about 3–3.5 min.

The obtained foam is then poured into a mold of suitable form and size, whereby the mold should not be completely filled to allow for additional expansion of approximately 20% during heating. The mold is then heated to a temperature of about 160–175° C., whereby the water expands the size of the cells slightly and is finally evaporated. As soon as the whole mass has obtained said temperature, the curing operation is completed and the foam is allowed to cool and is stripped from the mold. The foam does not stick to the walls of non-absorbent molds, and no lubrication is required. No preheating or precuring is required.

Contrary to the manufacture of cellular rubber from rubber latex, where the aqueous phase is the continuous phase and the cells are originally obtained as closed cells and have to be mechanically broken, the method of my invention produces directly cells which are opened and rendered communicating by the pressure of the expanding water vapor driven out during the fusing step. A further advantage of my method is that the composition may be refoamed at will simply by blowing in again air. Therefore, there are no production losses, as any overflow can be readily refoamed.

It is not necessary to produce the foam in a mold, but it is also possible to apply the foam directly to textiles, for instance by spreading it on the back of rugs, and to cure it in situ, whereby excellent adhesion to the textile fiber is obtained.

The product obtained is illustrated in Figs. 2 and 3 of the drawing. In the figures the reference numeral 1 designates the air filled cells, 2 is the aqueous solution entrapping the air in the unfused plastisol, and 3 is the thermoplastic resin. In fact, the cells are quite uniform and the different sizes shown in the drawing are only apparent due to the fact that the cross section cuts partly through the center of the cells and partly at a distance therefrom. The fused foam contains in the walls of the cells the non-aqueous component of the foam promoter.

The following examples illustrate certain ways in which the invention may be practiced, but are not to be construed as limiting its scope.

*Example 1*

Plastisol: Grams
- Bakelite resin VYNV-2 _____ 100.00
- Tricresyl phosphate _____ 60.00
- Modified polypropylene glycol dibenzoate __ 40.00
- Chlorinated paraffin plasticizer _____ 5.00
- Dioctyl phthalate _____ 25.00
- Cadmium stearate _____ 2.00
- Non-ionic organo-tin stabilizer (dibutyl tin dialkoxide) _____ 1.00

Foam promoter:
- Water _____ 34.42
- Polyethylene glycol ter-dodecyl thioether __ 2.00
- Dihexyl ester of sodium sulfosuccinic acid __ 0.36
- Water soluble gum (foam stabilizer) _____ 0.06

The Bakelite VYNV-2 resin used was a vinyl chloride-acetate resin containing a minimum of 95% vinyl chloride. The screen analysis was 100% through 20 mesh, 95% through 80 mesh.

The plastisol and foam promoter were mixed separately and were stable in this form. To foam, the foam promoter was added to the plastisol and whipped with a hand egg-beater for 2 min. producing a foam having a density of 15 pounds per cu. ft.

The foam was then poured into a mold to a depth of 1-inch and fused at a temperature of 160° C. for 1 hour.

In the same manner, the following formulations may be worked up to cellular structures:

*Example 2*

Plastisol: Parts
- A vinyl chloride-vinylidene chloride polymer (Geon 202 marketed by B. F. Goodrich & Co., see Handbook of Material Trade Names by Zimmerman and Lavine, 1953 ed., page 550), screen analysis 100% through 42 mesh, 95–100% through 100 mesh, 50–75% through 200 mesh _____ 100
- Tricresyl phosphate _____ 50.00
- Dipropylene glycol dibenzoate _____ 50.00
- Iso-octyl decyl phthalate _____ 12.00
- Mixture of mono and dichloro naphthalenes _ 3.00
- Submicroscopic particulate silica _____ 1.50
- Coprecipitate of lead orthosilicate and silica gel _____ 1.50

Foam promoter:
- Alkyl aryl sulfonate _____ 0.60
- Methyl cellulose _____ 0.10
- Polyethylene glycol tert-dodecyl thioether __ 2.00
- Water _____ 40.00

The term "plastisol" as used in the specification and claims is to be understood to define not only plasticized liquid compositions but also compositions which are solid at room temperature and assume the liquid state only during the fusion process.

The term "fusing" is used in its generally accepted meaning to designate the state where the resin particles start being solvated by the plasticizer. The fusing temperature of vinyl chloride resin compositions depends on the formulation and the type of plasticizer used, and is generally about 160–185° C., but not limited thereto.

In view of the many changes and modifications which may be made as regards the method and compositions herein disclosed without departing from the principle of the invention, it should be understood that the invention is as broad and as limited as defined in the appended claims. In particular, though the invention has been described with reference to the production of foam from vinyl chloride resins, similar thermoplastic resins can be employed in the same way. The method may also be applied to thermosetting resins by whipping up a foam of a foam promoting aqueous solution in liquid resin composition containing a catalyst, before the polymerization takes place and then curing the resin foam.

I claim:

1. The process of producing a uniform open-cell plastic material which comprises mixing together a plastisol formed from a thermoplastic consisting essentially of a vinyl halide resin and an aqueous surfactant solution, said surfactant being at least one selected from the group consisting of anionic and nonionic and said solution being incompatible with said plastisol; beating said resulting mixture to incorporate air particles therein to form a foam, said foam having a continuous plastisol phase, a discontinuous aqueous phase, and a discontinuous air phase, the air phase being substantially separated from the plastisol phase by a film of said aqueous solution; heating said foam to cure said plastisol and evaporate water therefrom; and thereafter cooling until said foam solidifies.

2. The process of claim 1 in which said plastisol has incorporated therein at least one vinyl halide resin and a plasticizer, and said aqueous solution contains a noncationic surfactant.

3. The process of claim 1 in which the resin portion of said plastisol comprises a vinyl halide resin as its major portion, the remaining portion being a resin capable of curing at substantially the same temperature as said vinyl halide resin.

4. The process of producing a uniform open-cell plastic material which comprises mechanically beating together from about 70 to about 93 percent by weight of a plastisol formed from at least one vinyl chloride resin and from about 30 to about 7 percent by weight of an aqueous surfactant solution, said surfactant being at least one selected from the group consisting of anionic and nonionic said said solution being incompatible with said plastisol, until the mixture is uniformly foamed, said foam having a continuous plastisol phase, a discontinuous aqueous phase, and a discontinuous air phase, the air phase being substantially separated from the plastisol phase by a film of said aqueous solution; heating said foam to a temperature of about 160° to about 185° C. to effect curing thereof and to evaporate water therefrom; and thereafter cooling until the foam solidifies.

5. The process of claim 4 in which from about 0.5 to 10 percent by weight of said surfactant solution is an anionic surfactant.

6. The process of claim 4 in which from about 5 to about 25 percent by weight of said surfactant solution in nonionic.

7. The process of claim 4 in which from about 0.1 to about 1.0 percent by weight of the surfactant solution is a water soluble foam stabilizer.

8. The process of claim 4 in which from 5 to 20 percent by weight of said solution is nonionic and from about 0.5 to about 3 percent by weight of said solution is anionic.

9. The process of claim 4 in which said plastisol contains a filler.

References Cited in the file of this patent
UNITED STATES PATENTS

| | | |
|---|---|---|
| 2,261,439 | Kelly | Nov. 4, 1941 |
| 2,386,995 | Wigal | Oct. 16, 1945 |
| 2,433,849 | Lathrop et al. | Jan. 6, 1948 |
| 2,657,186 | Klein et al. | Oct. 27, 1953 |
| 2,861,963 | Butsch | Nov. 25, 1958 |

OTHER REFERENCES

Chemical Age, volume 70, No. 1799, January 1954, page 20.

Todd: "Some Rheological Aspects of Vinyl Plastisols," Official Digest, February 1952, #325, pages 117, 119.